May 24, 1966  H. G. PYLES  3,252,525
PORTABLE DRILL HAVING STRAIGHT LINE MOTION
Filed Jan. 23, 1963  8 Sheets-Sheet 1

INVENTOR
*Harley G. Pyles*

BY *Mason, Fenwick & Lawrence*
ATTORNEYS

May 24, 1966  H. G. PYLES  3,252,525
PORTABLE DRILL HAVING STRAIGHT LINE MOTION
Filed Jan. 23, 1963  8 Sheets-Sheet 2

INVENTOR
Harvey G. Pyles
BY Mason, Fenwick & Lawrence
ATTORNEYS

May 24, 1966 H. G. PYLES 3,252,525
PORTABLE DRILL HAVING STRAIGHT LINE MOTION
Filed Jan. 23, 1963 8 Sheets-Sheet 4

INVENTOR
Harley G. Pyles

BY Mason, Fenwick & Lawrence
ATTORNEYS

May 24, 1966 H. G. PYLES 3,252,525
PORTABLE DRILL HAVING STRAIGHT LINE MOTION
Filed Jan. 23, 1963 8 Sheets-Sheet 7

INVENTOR
Harley G. Pyles
BY Mason, Fenwick & Lawrence
ATTORNEYS

May 24, 1966  H. G. PYLES  3,252,525
PORTABLE DRILL HAVING STRAIGHT LINE MOTION
Filed Jan. 23, 1963  8 Sheets-Sheet 8

INVENTOR
*Harley G. Pyles*

BY
*Mason, Fenwick & Lawrence*
ATTORNEYS

United States Patent Office 3,252,525
Patented May 24, 1966

3,252,525
PORTABLE DRILL HAVING STRAIGHT
LINE MOTION
Harley G. Pyles, Fairmont, W. Va., assignor, by mesne
assignments, to Galis Manufacturing Company, Fairmont, W. Va., a corporation of West Virginia
Filed Jan. 23, 1963, Ser. No. 254,544
13 Claims. (Cl. 173—27)

This invention relates to drilling machines, and particularly to mobile drilling machines especially adapted to drilling within mines, or other low roofed structures, and is a continuation-in-part of my prior application S.N. 827,317 entitled, Portable Drill, filed July 15, 1959, now abandoned.

In tunnel mining it is necessary that bolt holes be drilled in the tunnel roof, or in the mine floor, at spaced intervals so that support members may be secured in place. There are many factors which make it difficult to use automatic machinery in the drilling of these holes. The tunnel height is low and, therefore, unless full advantage of the major portion of the tunnel height can be utilized it is necessary to stop the drilling operation frequently to add extensions to the drill. The drill, of course, must maintain a straight course throughout its full advancing movement, and the mechanism for achieving this must not occupy much vertical space. It is necessary often that several holes be drilled in a row transversely of the tunnel, or the path of movement of the machine, and much time can be saved if all these holes can be drilled without moving the machine. Where the mine floor is not level, the problem of true vertical drilling is present for the machine will be tilted unless some provision is made to level it. In some cases, angular drilling is desirable, or is necessary due to tilting of the machine. Still another problem is the dust, usually rock dust, which is created by the drilling operation.

The general object of the present invention is to provide a drilling machine which will operate efficiently under all conditions, to perform drilling operations vertically upward, or downward, or at any angle to the vertical, without frequent interruptions.

A more specific object of the invention is to provide a machine of this character which will be capable of moving a drill along a predetermined straight course, whether the drilling be vertically upward, vertically downward, or at an angle.

Another object is to provide such a machine having means to move the drilling mechanism along a straight line transversely of the path of movement of the machine.

A further object of the invention is the provision of a drilling machine capable of moving a drill along a long vertical path with substantially no deviation, and accomplishing the movement with mechanism of low height, using no long levers except a boom.

A still further object of the invention is to provide a drilling machine having improved suspension means whereby the body may be kept substantially horizontal while the wheels are free to follow an uneven floor.

Yet another object is the provision of such a machine having novel dust collecting means to prevent the escape of the dust into the atmosphere of the tunnel.

Other objects of the invention will become apparent from the following description of practical embodiments thereof, when taken in conjunction with the drawings which accompany, and form part of, this specification.

In the drawings:

FIGURE 11 is a transverse vertical section through the machine, taken on the line 11—11 of FIGURE 10;

FIGURE 15 is a somewhat diagrammatic side elevation of the machine as shown in FIGURES 13 and 14, illustrating the drill movement in angular drilling; and FIGURE 16 is a view similar to FIGURE 1 showing the device arranged for downward drilling.

In general, the machine takes the form of a low, self-propelled car, having means thereon for raising a drill pot along a straight path for drilling into a mine roof or a mine floor. The car is mounted upon a suspension unit in such fashion that the wheels can follow the mine floor contour while the car frame remains horizontal. The drilled rock dust is removed from the hole through the drill and drill driving mechanism. In one form of the disclosed invention, the drill pot raising means is movable transversely to produce straight line transverse movement of the drill pot to permit drilling a series of holes in a straight transverse row without moving the car.

Referring to the drawings in detail, and first adverting to that form of the invention shown in FIGURES 1 to 8 inclusive, there is shown a car 1, which includes a frame 2 mounted upon a wheeled suspension unit 3. The frame may take any convenient form, but is shown as consisting of spaced, parallel side plates 4, interconnected by a front sill 5 and a plurality of transverse bridge members 6 as needed. The frame may be suitably strengthened and braced as may be required.

The suspension unit (see FIGURES 1, 2 and 3) includes a pair of side bars 7 pivotally mounted on an axle 8, which extends completely across the car frame and is supported by the frame side plates 4. The axle passes through the side bars and projects beyond them to receive the rear wheels 9 of the car. Although the side bars 7 are free to rock in vertical planes about the axle 8, the wheels 9, being rotatably mounted on the axle, will have no bodily movement relative to the frame. The side bars 7 extend forwardly beyond the sill 5 and pivotally connect to the ends of a transverse equalizer bar 10, which lies in front of the sill and is pivoted at its mid-point to the sill by means of a pivot pin 11, connected to the sill and projecting forwardly on the longitudinal centerline of the car. The pivotal connections between the ends of the side bars and the equalizer may be formed by seating the ends of the equalizer in openings 12 near the ends of the side bars, with the openings being sufficiently large to receive the equalizer bar ends and permit them to rock in the opening. Front wheels 13 are mounted on the side bars on stub shafts 14 which are carried by the bars and project outwardly therefrom.

It will be obvious that a vehicle frame, mounted as described above, will maintain a level position and be subject to litttle vertical movement in travelling over an uneven surface. Movement of one front wheel vertically will result in an equal and opposite vertical movement of the opposite front wheel relative to the frame pivot pin 11, and a vertical movement of the frame equal to but half the wheel movement.

Figure 1:
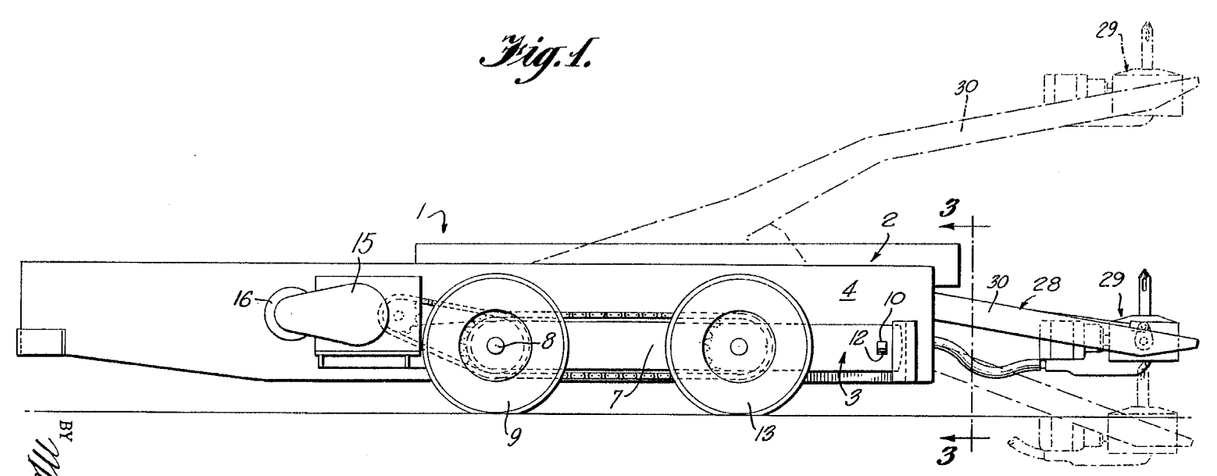
FIGURE 1 is a side elevation of a roof drilling machine embodying the principles of the present invention.
Figure 2:
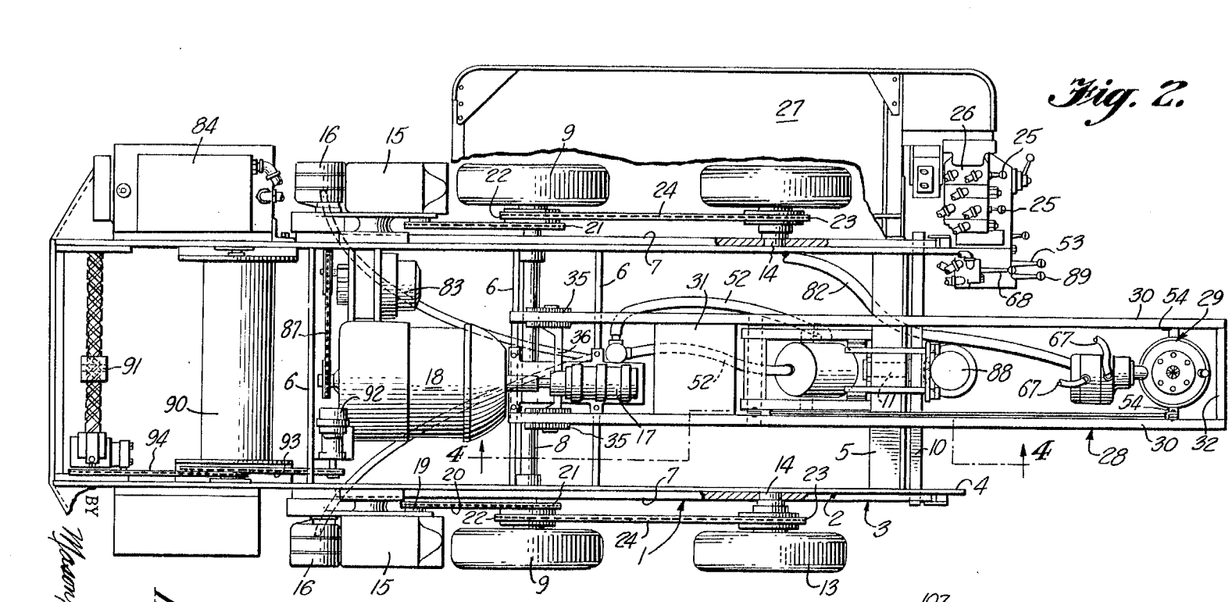
FIGURE 2 is a top plan view of the machine shown in FIGURE 1.
Figure 3:
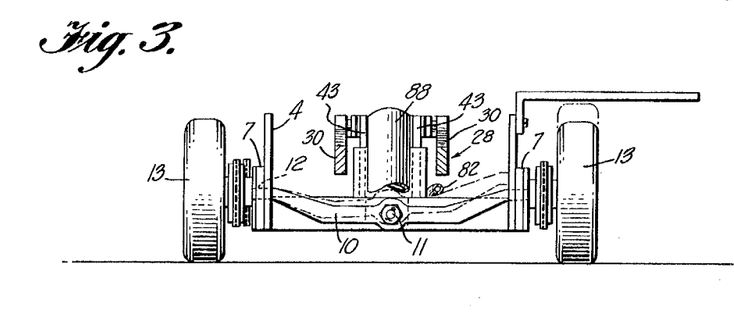
FIGURE 3 is a transverse section taken on the line 3—3 of FIGURE 1, illustrating a portion of the suspension for the machine frame.

The side bars 7 extend rearwardly beyond the back wheels and each one carries a speed reducer 15 and hydraulic motor 16 (see FIGURES 1 and 2). The motors are operated by fluid fed through lines from a hydraulic pump 17, suitably mounted on the car frame and driven by a motor 18. Sprockets 19 on the speed reducers carry chains 20 which drive sprockets 21 on the rear wheels 9. Additional sprockets 22 on the rear wheels and sprockets 23 on the front wheels 13 are connected by chains 24 to carry the drive to the front wheels. This simple chain drive to all four wheels is made possible by the fact that the wheels on each side, and the drive means for the wheels, are all mounted on the side bars, so that there is no relative bodily movement of the several driving and driven elements. The speed reducer and motor also serve to counterbalance the weight of the forward arms of the side bars and front wheels, so that the side bars are free to move about their pivots without lifting excessive weights.

The hydraulic motors are independently operable by means of valve control 25 on a control board 26 (see FIGURE 2), which is located forwardly of the machine and convenient to an operator lying prone upon an operator's platform 27 mounted on one of the side bars 7. The independent operation of the motors makes it possible to turn the car by controlling the relative speeds of the wheels on opposite sides of the machine.

The car carries a boom 28 which lies longitudinally over the front part of the car and projects forwardly thereof to carry a drill pot 29. The boom is mounted so that it may be moved vertically and the drill pot will be moved along a straight vertical path (see particularly FIGURES 2, 4 and 5). The boom consists of a pair of side rails 30 held in spaced, parallel relation by an interconnecting web 31 near the base of the boom and a bridge bar 32 at the outer end. The boom is carried by an elevating link 33 and an oscillating link 34, with both links being pivotally mounted on the car frame.

The oscillating link 34 (see FIGURES 4 and 5) is formed as a pair of arms 35 held in spaced parallel relation by a bridging web 36. The arms 35 are connected at their bottoms by pivot pins 37 to longitudinal struts 38 extending between two of the transverse bridge members 6 of the car frame. The upper ends of the arms are connected by pivot pins 39 to the side rails 30 of the boom. It will be seen by reference to FIGURE 4 of the drawings, that the oscillating link may swing forwardly and backwardly in a vertical plane about the pivot pins 37 and, in so doing, will shift the boom forwardly and rearwardly of the car.

Figure 4:
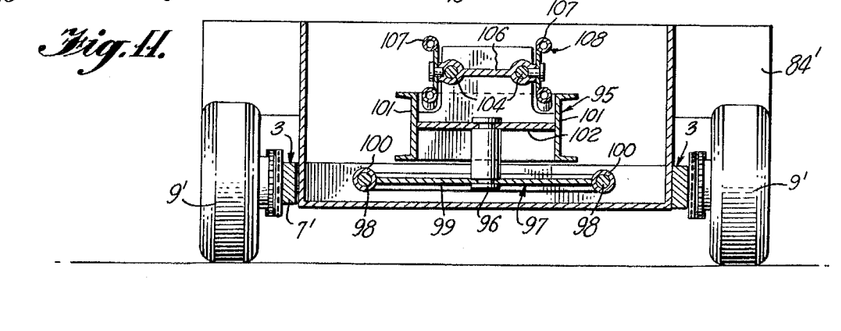
FIGURE 4 is an enlarged partial vertical section through the machine, taken on the line 4—4 of FIGURE 2 and showing in detail the mechanism for moving and controlling the boom.

The elevating link 33 is also composed of a pair of parallel arms 40, held spaced by a sleeve 41. One end of the link is pivoted to the frame by means of pins 42, which pass through the arms and vertical brackets 43 carried by the front sill 5 of the frame. The opposite ends of the arms are pivotally connected to the boom by a pivot shaft 44, which passes through the arms and sleeve 41 and the side rails 30 of the boom. This provides a mounting which will permit vertical swinging movement of the elevating link 33 to raise and lower the boom. Due to the fact that the pivot 44 swings in an arc about pivots 42, the boom will be moved forwardly and rearwardly, controlled by the oscillating link 34. The movement of the free end of the boom, that is the end carrying the drill pot, will be the resultant of the actions of the two links. The normal arcuate movement of a boom around a fixed pivot is compensated for in the present arrangement by an equal and opposite arcuate movement of the elevating link, so that the upward travel of the boom outer end and the drill pot will be along a straight path. The underlying principle of this linkage arrangement is known as the "Scott Russell straight line movement."

Figures 4, 5:
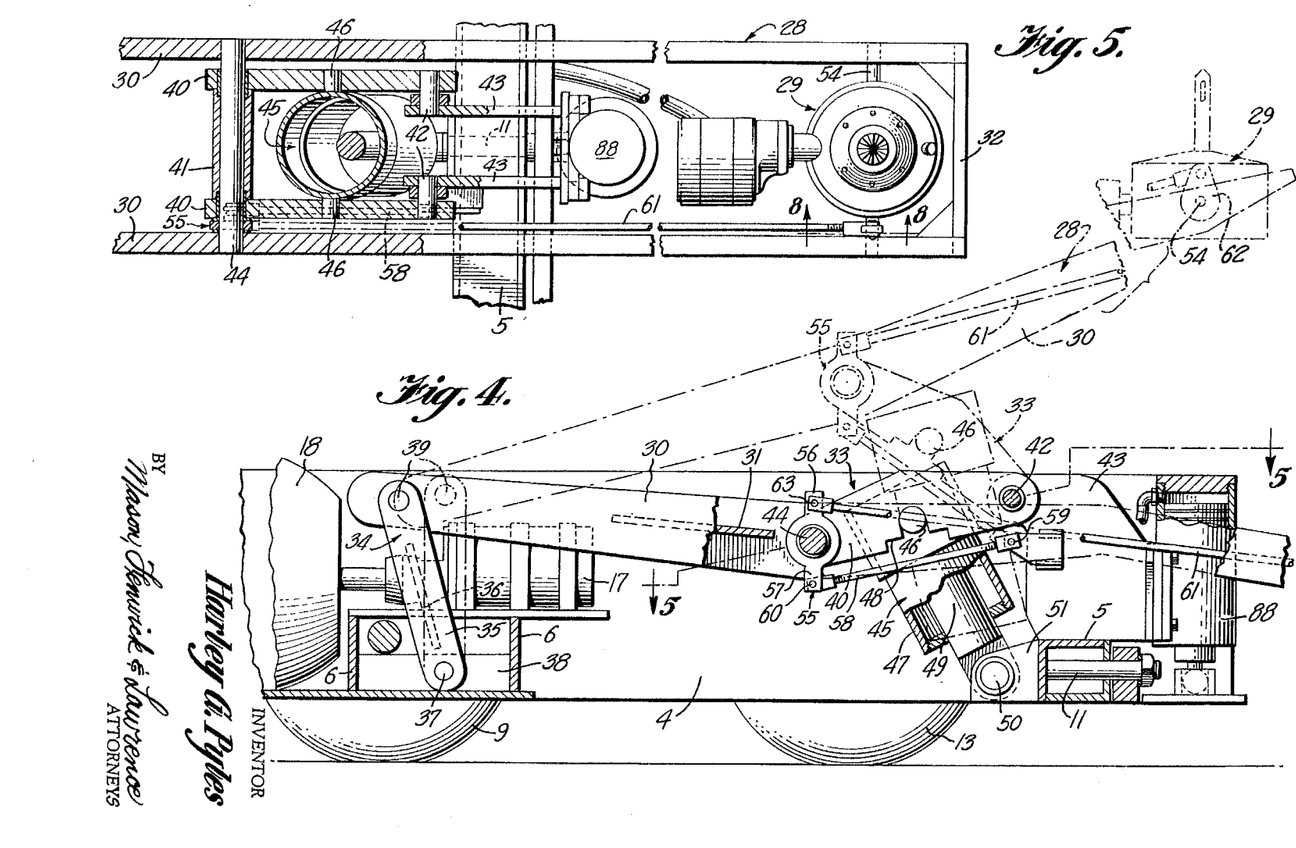
FIGURE 5 is a horizontal section taken on the line 5—5 of FIGURE 4.

In order to raise and lower the boom, a hydraulic jack 45 is employed (see FIGURES 4 and 5). The jack has trunnions 46 on opposite sides of the jack cylinder 47 seated in recesses 48 in the underside of the elevating link arms 40. The jack piston rod 49 is pivotally connected at 50 to ears 51 projecting rearwardly from the front sill 5. The jack is connected by fluid lines 52 with the hydraulic pump 17, and the flow of fluid in the lines is controlled by a lever 53 on the control board. It will be obvious that the jack will be operative to lift the elevating link 33 and allow it to lower, thus serving to raise and lower the boom and drill pot. By connecting the jack to the elevating link midway between the link pivots, and connecting the link to the boom relatively close to the pivotal connection to the oscillating link, a very compact linkage is provided which will enable the drill pot to be moved along a relatively long path. Thus, in a car having an overall height of but two feet the linkage can provide for movement of the drill pot along a path well over four feet in length.

The drill pot 29 is pivotally connected to the boom arms 30 by means of trunnions 54 which project from its sides (see FIGURES 4 and 5). During upward movement, the boom constantly changes its angular position and it is necessary, therefore, to provide means to maintain the drill pot level with its drill shaft axis vertical. To accomplish this, a pivot link 55 is freely mounted on the pivot shaft 44, intermediate one arm of the elevating link 33 and a side rail 30 of the boom. The link is provided with oppositely projecting arms 56 and 57. Arm 57 is connected by a rod 58 to one of the brackets 43. The pivotal connection 59 between the rod and the bracket is a fixed point and, together with the fixed pivot 42, the pivot 44 and the pivot 60 between the arm 57 and rod 58 form the four pivotal points of a parallelogram. Thus, if the position of the pivot link is vertical in one position of the elevating link, it will remain vertical in all positions of the elevating link. The upper arm 56 of the pivot link is connected by a rod 61 to a lever arm 62 fixed to one of the trunnions 54 on the drill pot. Pivot 44, pivotal connection 63 between arm 56 and rod 61, pivotal connection 64 between rod 61 and lever arm 62, and trunnion 54 form the pivots of a second parallelogram. Consequently, if pivot link 55 is maintained vertical the position of the drill pot will remain unchanged throughout all movement of the boom.

Figure 6:
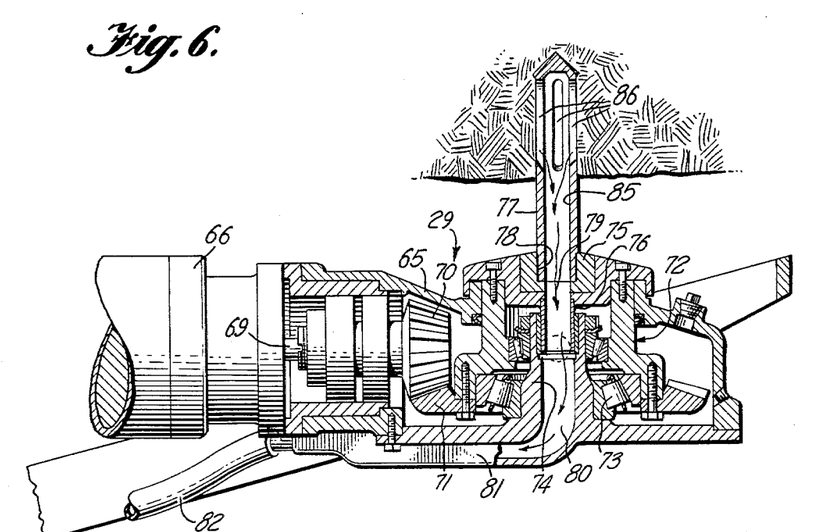
FIGURE 6 is an enlarged vertical section through the drill pot and drill, showing the improved means for carrying off the dust.
Figure 7:
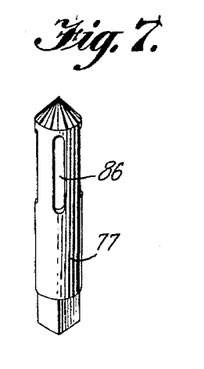
FIGURE 7 is a perspective view of a drill used in connection with the device.
Figure 8:
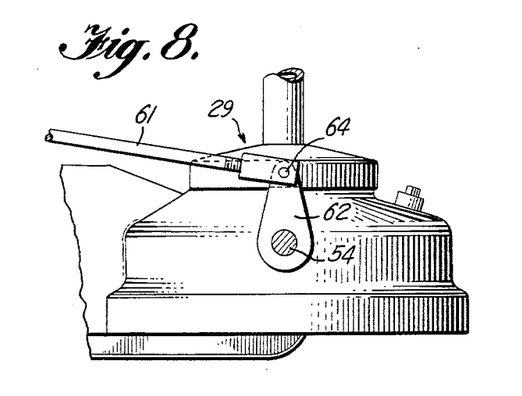
FIGURE 8 is a detail view showing the drill pot and the rod which forms part of the parallelogram mechanism for holding the drill pot so that the drill shaft will be vertical at all positions of the boom.

Referring particularly to FIGURE 6, the drill pot is shown to include a gear box 65 and a hydraulic motor 66 connected to it. The motor is connected by fluid lines 67 with the fluid pump 17 and controlled by valve lever 68. Shaft 69 of the motor 66 is coupled to a bevel gear 70 in the gear box, which gear is in mesh with a bevel gear 71 fixed to the bottom of a drill turret 72. The turret is mounted on a suitable antifriction bearing 73 seated upon a vertical column 74 rising centrally of the gear box. The column 74 is connected to the bit-receiving head 75 of the turret by means of a sleeve 76. A bit 77 is mounted in a bit seat 78 centrally of the bit-receiving head 75. The bit seat 78 and the column 74 are in vertical alignment. The bit head has an opening 79 from the bit seat to the sleeve 76, and the column has a passageway 80 in communication with the bottom of the sleeve. The passages 79 and 80 and the sleeve 76 form a continuous duct, coaxial with the vertical center of the drill turret, leading from the drill seat to the bottom of the gear case. The bottom of the passage communicates with a duct 81 under the gear case. Duct 81 is connected by hose line 82 with a blower 83 and from the blower to a dust collector 84. The bit 77 is centrally drilled, as at 85, and has its shank apertured just below the cutting head to provide a plurality of inlet ports 86 communicating with the central bore 85 in the bit. Rock dust ground by the bit in drilling may be drawn in through ports 86 and through the bore 85, passage 79, sleeve 76, passage 80, conduit 81 and hose line 82 to the blower 83 and into the collection box 84. In this way the dust is drawn through the bit and its rotating turret and into a collection box without escaping into the air. The blower is driven by a chain 87 from the main motor 18.

The car may be equipped with one or more stabilizing jacks 88 (see FIGURES 2, 4 and 5) mounted on the frame. These jacks are fluid operated and controlled by lever 89. The jacks operate to contact the mine floor and hold the car rigid during the drilling operation.

The car may also carry a cable spool 90 and a cable fairlead 91 (see FIGURE 2). These may be driven from a hydraulic motor 92 by chains 93 and 94. The cable mechanism may be used as a winch, or as means for raising and lowering the car along steep inclines, or with jacks for moving the car from place to place in the mine. The car may also carry a cable spool for paying out or collecting the electrical power cable.

In operating the machine, it is driven by means of the motors 16 to the desired place of use. The boom will be in fully lowered position and the car can move freely through very low tunnels. The car can be steered by increasing or decreasing the speed of the wheels on one side of the car relative to those on the other side. When the position of use is reached, the stabilizing jack is lowered to fix the car position and brace the frame. A bit is inserted in the bit seat in the drill pot, and jack 45 is put into operation to lift the elevating link 33 and thereby lift the boom and raise the drill. As the elevating link follows its arcuate path, the boom will be moved longitudinally as well as vertically. This will cause rocking movement of the oscillating link 34 and maintain the bit 77 on a substantially straight course, in this case, vertically upward. When the drilling is completed, the boom can be lowered, the stabilizing jack lifted, and the car moved to a new location. The drilling will be substantially dust free, due to the collection of the dust from the hole through the bit and its rotating mount.

In FIGURES 9 to 12, a somewhat different machine is shown. The major differences are in substituting a sliding block arrangement for connection to the lower end of the boom instead of the oscillating link described previously, and arranging the entire boom structure for transverse swinging movement to move the drill pot in a straight line at right angles to the longitudinal center line of the car. The suspension is modified slightly by having the stabilizing bar at the rear instead of at the front. Only the boom structure of the modified arrangement will be described in detail; the remaining parts of the car are given the same reference numerals previously used with the addition of a prime.

In the modified structure, the boom assembly is mounted upon a bed 95 (see FIGURES 10, 11 and 12) which is pivoted by means of a pivot post 96 to a carriage 97, slidable longitudinally of the car along guide rails 98 which are mounted in selected ones of the transverse bridge members 6' of the frame. Carriage 97 consists of a body 99 having sleeves 100 at its ends to ride along the rails 98. The body 99 is in the form of a rectangular, horizontal plate extending between the sleeves 100 with vertical flanges 99' along its side edges. The pivot post 96 is mounted vertically at the center of the carriage.

Figure 10:
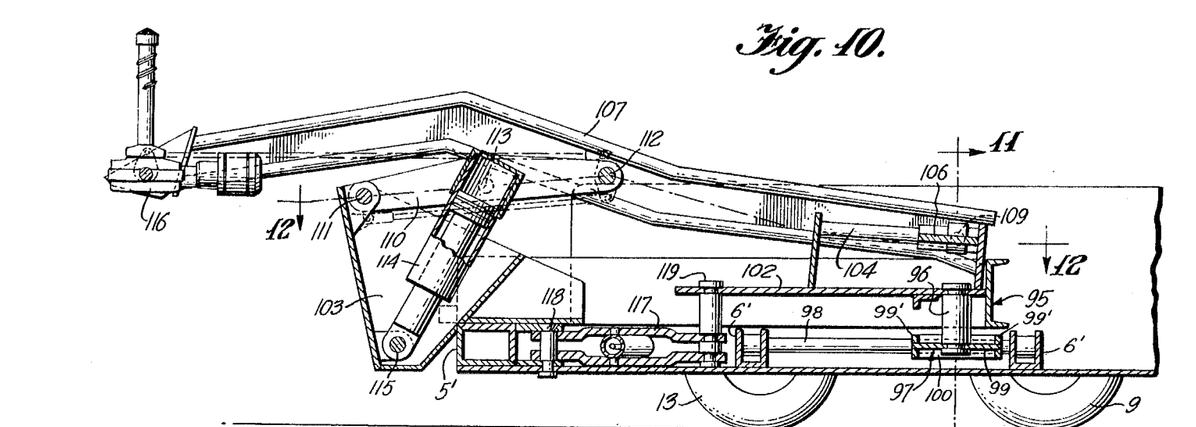
FIGURE 10 is a longitudinal section through the machine of FIGURE 9 and is taken on the line 10—10 of FIGURE 9.
Figure 12:
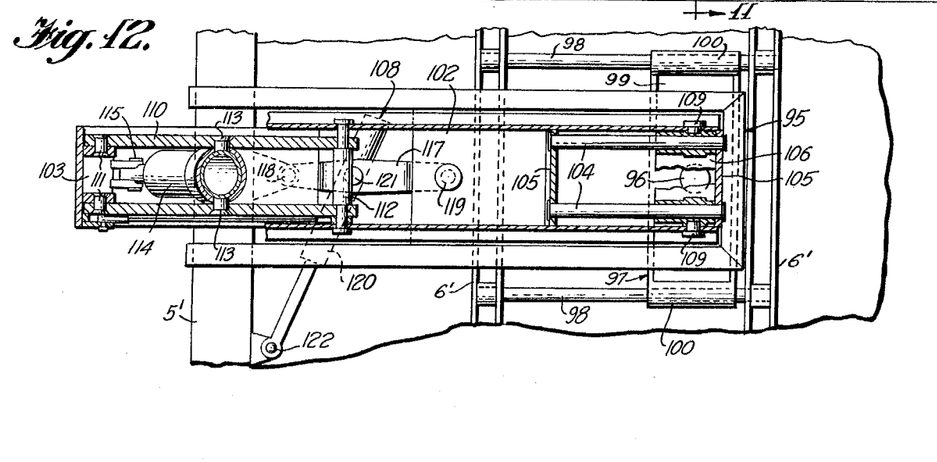
FIGURE 12 is a fragmentary horizontal section, taken on the line 12—12 of FIGURE 10, illustrating the mechanism for obtaining transverse straight line movement of the drill mechanism.

Bed 95 is formed of a pair of side channels 101 held in spaced, parallel relation by a spacer web 102 near one end, and a mounting bracket 103 which bridges and closes the other end. Connection of the pivot post to the web 102 supports the inward end of the bed and permits the bed to swing horizontally. The outer end of the bed rests, and slides upon, the front sill 5'.

At the inward end of the bed, there are a pair of longitudinally extending, laterally spaced, parallel guide rods 104, supported above the web 102 by transverse supports 105 (see FIGURES 10 and 11). A sliding block 106 is mounted on rods 104, and the inner ends of the side rails 107 of the boom 108 are pivotally connected to the block, as at 109 (see FIGURES 11 and 12). This arrangement permits the boom to move longitudinally of the bed in somewhat the same manner as the oscillating link of the structure previously described. The guide rods 104 are supported so that they incline rearwardly to provide for a more direct pull and thrust in the operation of the boom and thus facilitate movement of the sliding block along the guide rods.

The boom is supported forwardly of the sliding block and raised and lowered by means of an elevating link 110 which is pivoted to the end bracket 103 by pivot pins 111 and to the side rails of the boom by pivot shaft 112 (see FIGURES 10 and 12). The elevating link is pivoted intermediate its ends at 113 to the cylinder of a lifting jack 114. The piston rod of the jack is pivotally connected to the end bracket 103 by pin 115. Boom 108 carries a drill pot 116 at its outer end, and it will be evident that the drill pot will be caused to move in a straight vertical line in the same manner as with the structure previously described.

A similar mechanism to that used for lifting the boom is employed in a horizontal plane for causing transverse rocking movement of the bed 95 about its pivot 96, while maintaining the movement of the drill pot in a vertical plane transverse to the longitudinal axis of the car (see FIGURES 10 and 12). This mechanism includes a link 117, pivoted to the front sill 5' at 118 and to the web 102 of the bed 95 at 119. Rocking movement of the link will cause the bed to oscillate about its pivot 96. The arcuate path of the pivot 119 will cause the bed and its carriage 97 to move longitudinally along the guide rails 98 to compensate for what would otherwise be arcuate movement of the outer end of the boom and the drill pot and hold that movement to a straight line. The link 117 is moved by means of a jack 120. The jack is pivoted to the link 117 at 121 and to the car frame at 122. Jack 120 will be connected to the pressure fluid system under control of the pump 17' in the same manner as the jacks previously referred to.

It will be apparent that through operation of the two jack and link systems, the drill pot will be caused to move transversely as well as vertically. Movement of the drill pot will be confined at all times to a single vertical plane transversely of the car. A series of holes may be drilled in a transverse row by swinging the bed 95 desired distances horizontally and then drilling by raising the boom. When the bed has been moved step-by-step and the required drilling done to complete a transverse row, the machine may be moved forward and another row of holes drilled.

Figure 9:
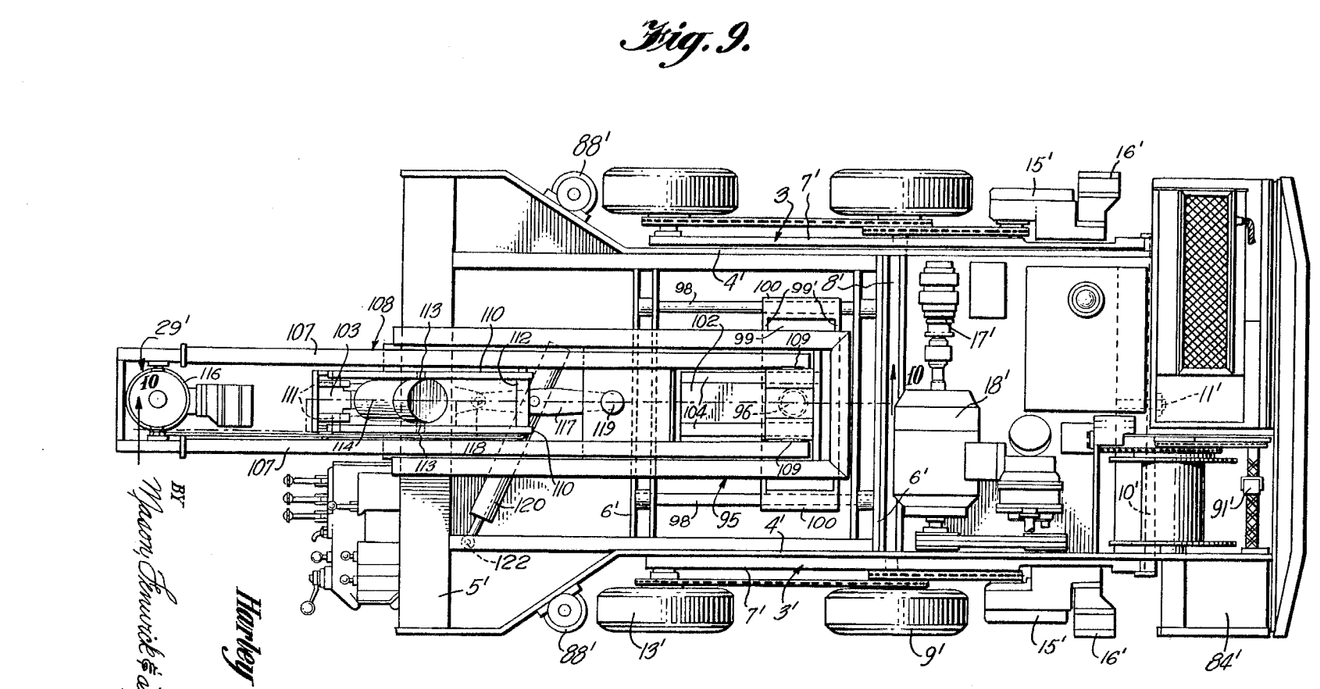
FIGURE 9 is a top plan view of a machine of slightly modified construction.

As mentioned above, the suspension system is reversed in the modified structure (see FIGURES 9 and 11). The side bars 7' are pivotally mounted, as before, on the shaft 8'. Shaft 8' carries wheels 9' and wheels 13' are mounted at the front ends of the side bars. The rear portions of the side bars carry the speed reducers 15' and motors 16'.

The equalizer bar 10' in this case is connected to the rear ends of the side bars and pivoted at its middle to the frame, as at 11'. The action of the suspension is substantially the same as in the form first described.

Figures 13, 14:
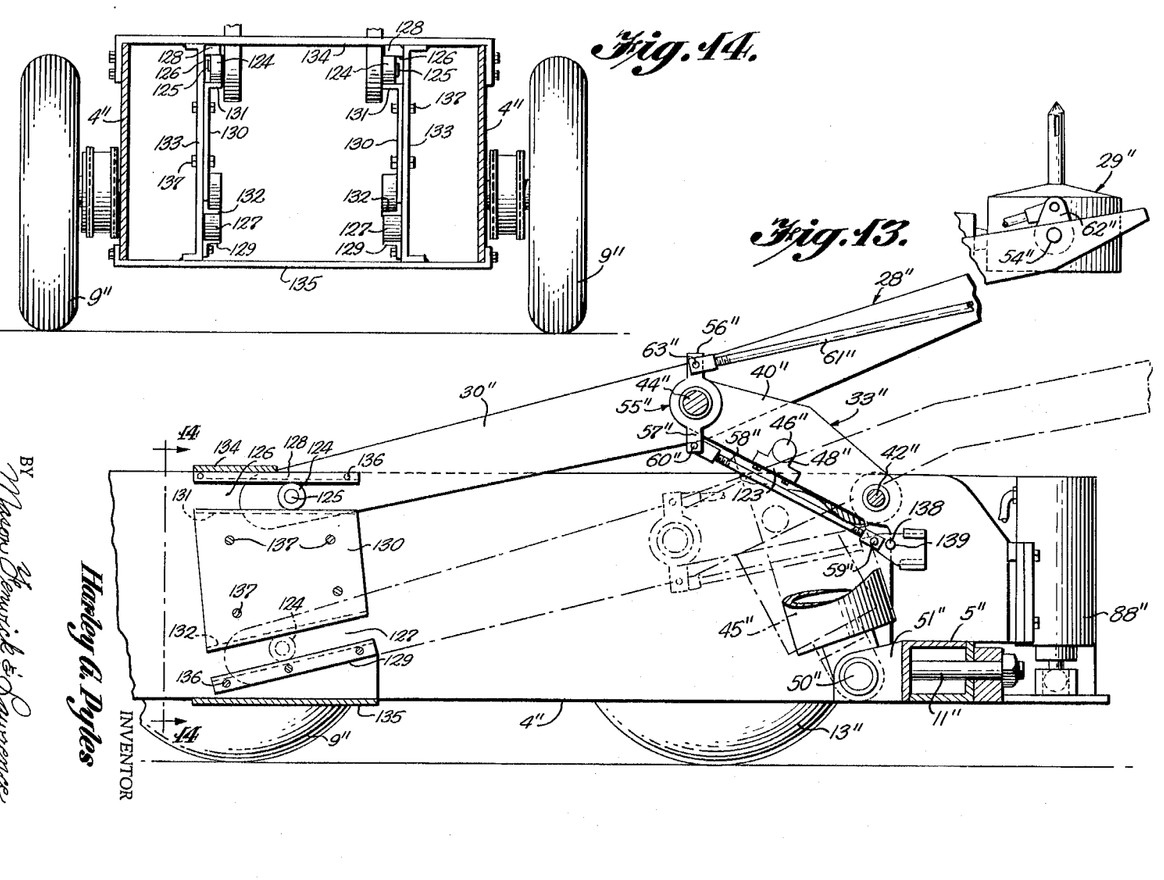
FIGURE 13 is a view similar to FIGURE 4, illustrating a machine adapted for vertical or angular drilling.
FIGURE 14 is a transverse section taken on the line 14—14 of FIGURE 13.

The machine shown in FIGURES 13 and 14 is similar to that shown in FIGURES 1 to 8, with some slight structural changes, and includes means to cause the drill pot to move vertically for upward and downward drilling, or to cause the drill pot to move along a straight line which is at an angle to the vertical. In connection with this form of the invention, also, the basic structure is given the same reference character but with the addition of a double prime.

The frame is the same as before, having side plates 4" held in spaced relation by transverse bridge members 6". A sill 5" connects the front ends of the side plates. Vertical brackets 43" are carried by the sill, and provide mounting members for elevating links 33". Pins 42" pivotally connect one end of links 33" to brackets 43", so that the links can swing in vertical planes. Jack 45" has one end pivotally attached to mounting ears 51" on the sill by means of pin 50", and is connected to the elevating links 33" intermediate its ends through pivots 46". It will be seen that the notches 48" in the links are bridged by bars 123 to cause the jacks to be operative to swing the links in both directions. The outer ends of links 33" are pivotally connected by shaft 44", to the arms 30" of a boom 28". Boom 28" carries a drill pot 29" at its outer, free end.

The inner end of the boom, that is, that end of the boom which has a movable pivotal connection, is provided with a somewhat different mounting than in the previous forms. In this embodiment, the boom is selectively engageable in, or movable to, either of two slide paths, angularly related to one another, with one path being oriented to provide the slide motion necessary to the boom pivot to maintain vertical straight line movement of the drill, while the other path will provide for sliding movement of the boom pivot substantially perpendicular to a selected line of drill movement angularly related to the vertical.

In order to accomplish this variation in drilling direction, each of the boom arms carries a guide roller 124, rotatably mounted upon pivot pins 125 in the ends of the boom arms. Rollers 124 may roll along either slide path 126 for vertical drilling, or slide path 127, for angular drilling. The paths are shown as formed of upper, fixed slide rails 128, lower fixed slide rails 129, and a central, removable member 130 which carries rails 131 and 132 forming, respectively, the companion rails for rails 128 of path 126, and rails 129 of path 127.

The several rails may be mounted upon vertical plates 133, fixed top and bottom to cross-members 134 and 135 spanning the vehicle body at the top and bottom of side plates 4". Fixed rails 128 and 129 may be bolted, riveted, or otherwise secured to plates 133, as at 136. Central members 130 may be fastened to plates 133 by bolts 137 so that they will be readily removable.

With the guide rollers 124 seated in the slide path 126, the boom will have substantially the same movement as in the form of the invention previously described, as the slide path of the boom end will be generally horizontal. With the parallelogram linkage control for the drill pot afforded by the rods 58", 61" and levers 55", 62", and the motion given the drill pot by the boom under control of elevating links 33", drilling may be accomplished in a straight line vertical direction.

If it is desired to drill at an angle to the vertical, the boom will be lowered until its outer end rests upon a suitable chock on the ground, or mine floor. The central guide members 130 will be removed by taking out bolts 137. The boom foot end will remain elevated, due to the support given by links 33" under the influence of jack 45". Operation of the jack will lower the links 33" and the boom end to bring guide rollers 124 to rest on the rails 129. Members 130 can then be re-attached to the plates 133 to confine the rollers between rails 129 and 132 to hold the boom end to sliding movement along slide path 127. This will be at an angle to the path 126, with the projections of the paths 126 and 127 in most instances intersecting at, or near, fixed pivot 42" of elevating links 33." This will align the boom slide path properly to cause the boom outer end to move along a line which is at an angle to the vertical. The boom outer end, and the drill pot, will now follow a straight line path approximately at right angles to the longitudinal direction of the slide path.

The drill pot control linkage had been set to maintain the drill axis vertically during all movement of the boom. In order to tilt the drill pot to align the drill with the new angular path of drill pot movement, it is necessary to reset the control linkage. This can be done by providing the bracket 138, to which rod 58" connects, with a second hole 139 to receive the pivot pin 59". Hole 139 will be located to one side of the vertical plane including pivot 42" to an extent sufficient to align the pivot 42" and hole 139 at an angle to the vertical equal to the angle at which the drill pot will operate when the boom is in its lowered position. Thus, when rod 58" is pivotally connected to bracket 138 through hole 139, the drill pot will be turned about its trunnions 54" to orient the drill chuck and the drill in alignment with the new drill angle. The control linkage will now hold the drill at the proper angle throughout all movement of the boom. The movement of the drill along the selected angular path is clearly shown in FIGURE 15.

It will be obvious that the unit shown in FIGURES 13 to 15 can have two, or more, slide paths, or the boom end can be movable to several positions intermediate two extremes.

While the embodiment of the invention shown in FIGURES 13, 14 and 15 has been illustrated in conjunction with structure of FIGURE 1 for simplicity, it will be understood that it is equally applicable to that form shown in FIGURE 9 where the entire vertically tiltable boom mechanism is mounted upon a horizontally swingable bed.

Any of the several embodiments can be used to drill downwardly as well as upwardly. For example, the unit shown in FIGURE 1 is illustrated diagrammatically in FIGURE 15 set up for downward drilling. In order to prepare the machine for downward drilling, it is necessary to release the drill pot from its connection to the parallelogram control linkage and loosening the hydraulic hoses 82 so that the drill pot may be rotated on its trunnions 54 to reverse its position to orient the drill holder downward. The control linkage can be reconnected, but the lever 62 must be reversed relative to the drill pot to maintain the proper relationship with the remainder of the control linkage. With this adjustment, the control linkage will occupy the same position as before, and the drill pot will be maintained in a vertical position.

It is believed that the operation of the several embodiments of the mobile drill will be completely clear from the above description without the necessity of further review.

While in the above, practical embodiments of the invention have been disclosed, it will be understood that the details of construction shown and described are merely for purposes of illustration, and the invention may take other forms within the scope of the appended claims.

What is claimed is:

1. A portable drilling machine comprising, a wheeled car, means mounted on the car for reciprocating movement longitudinally of the car, a bed pivotally connected at one end to the reciprocating means and projecting forwardly from the pivotal connection, a swinging lever pivotally connected at one end to the car and at the other end to the bed, the swinging lever projecting rearwardly from its pivotal connection with the car, means to move the swinging lever, means mounted on the bed for reciprocating movement longitudinally of the bed, a boom pivotally connected to the reciprocating means on the bed, and projecting longitudinally forwardly of the bed, an elevating lever pivotally connected at one end to the bed and at the other end to the boom, the elevating lever extending rearwardly of the bed from its pivotal connection to the bed, means to move the elevating lever, a drill pot having a drill axis pivotally mounted at the forward end of the boom, and means to hold the drill pot with the drill axis vertical in all positions of the boom.

2. A portable drilling machine as claimed in claim 1 wherein the oscillatable means on the car and on the bed each comprises, a sliding block mounted upon longitudinally arranged support rails.

3. A portable drilling machine as claimed in claim 1 wherein the means for holding the drill pot with the drill axis vertical comprises, a lever on the drill pot for rocking the drill pot about its pivotal connection to the boom, a pivot link freely mounted on the pivotal connection between the boom and the elevating link and having oppositely extending lever arms, a tie rod pivotally connected to one of the arms of the pivot link and the lever on the drill pot, and a tie rod pivotally connected to the other lever arm of the pivot link and to the bed at a point adjacent the pivotal connection between the elevating lever and the bed.

4. A portable drilling machine as claimed in claim 3 wherein the said one pivot link lever arm, the lever of the drill pot, the first-mentioned tie rod, and the boom from the pivotal mounting of the pivot link to the pivotal mounting of the drill pot form a parallelogram, and the other lever arm of the pivot link, the elevating lever, the second-mentioned tie rod, and the distance from the pivot connection of the elevating lever to the bed to the pivot connection of the second-mentioned tie rod to the bed form a second parallelogram.

5. A portable drilling machine comprising, a wheeled car, means on the car forming a slide path, a boom, means pivotally connected to one end of the boom and movable along the slide path, a drill pot pivotally mounted at the other end of the boom, an elevating link pivotally connected at one end to the car and extending generally toward the slide path, said elevating link having its other end pivotally connected to the boom intermediate the boom connections to the means movable along the slide path and the drill pot, means for rocking the elevating link about its pivotal connection to the car, and means for holding the drill pot with the drill axis vertical in all positions of the boom including, a lever on the drill pot for rocking the drill pot about its pivotal connection to the boom, a pivot link freely mounted on the pivotal connection between the boom and the elevating link and having oppositely extending lever arms, a tie rod pivotally connected to one of the arms of the pivot link and the lever on the drill pot, and a tie rod pivotally connected to the other lever arm of the pivot link and to the bed at a point adjacent the pivotal connection between the elevating link and the car.

6. A portable drilling machine as claimed in claim 5 wherein, the said one pivot link lever arm, the lever of the drill pot, the first-mentioned tie rod and the boom from the pivotal mounting of the pivot link to the pivotal mounting of the drill pot form a parallelogram, and the other lever arm of the pivot link, the elevating lever from its connection to the car to the pivot link, the second-mentioned tie rod, and that portion of the car from the pivotal connection to the car to the pivotal connection of the second-mentioned tie rod to the car form a second parallelogram.

7. A portable drilling machine comprising, a wheeled car, means on the car forming at least two slide paths extending longitudinally of the car with a first slide path lying generally horizontal and a second slide path vertically spaced from the first and lying at a vertical angle to the first, a boom, means pivotally connected to one end of the boom and movable along said slide paths selectively, a drill pot pivotally mounted at the other end of the boom, an elevating link pivotally connected at one end to the car and extending generally toward the slide paths, said elevating link having its other end pivotally connected to the boom intermediate the boom connections to the means movable along the slide paths and the drill pot, means for rocking the elevating link about its pivotal connection to the car, and adjustable means connected to the car and the drill pot to hold the drill pot with the drill axis vertical when the means movable along the slide paths is in the first said slide path and to hold the drill pot with the drill pot axis at an angle to the vertical when the means movable along the slide paths is in the second said slide path.

8. A portable drilling machine as claimed in claim 7 wherein, the connection of the elevating link to the car is adjacent the intersection of the projected slide paths.

9. A portable drilling machine as claimed in claim 7 wherein, the means forming the slide paths includes an upper guide rail providing a top guide for the first guide path, a lower guide rail providing a bottom guide for the second path, and a central member having top and bottom rails providing respectively the bottom guide of the first slide path and the top guide of the second slide path.

10. A portable drilling machine as claimed in claim 9 wherein, the central member is removable to allow the means movable along the slide paths to shift from one slide path to another.

11. A portable drilling machine as claimed in claim 7 wherein, the adjustable means to hold the drill pot includes linkage forming with the elevating link a control parallelogram, the linkage having two selective connection positions on the car, a first connection position vertically aligned with the pivotal connection of the elevating link to the car to maintain the drill pot vertical, and a second connection position aligned with the pivotal connection of the elevating link to the car at a vertical angle equal to the vertical angle of the path of the drill pot when the means movable along the slide paths is in the second slide path to hold the drill pot with the axis parallel to the path of travel of the drill pot.

12. A portable drilling machine comprising a wheeled car, a bed mounted on the car, a boom pivotally mounted at one end on the bed for swinging movement in a vertical plane, a drill pot having a drill axis pivotally mounted on the other end of the boom, means to swing the boom vertically while confining the movement of the drill axis along a predetermined straight vertical line, said bed being pivotally mounted at one end on the car for swinging movement in a horizontal plane transversely of the car, and means to swing the bed transversely while confining the movement of the drill axis to a vertical plane at right angles to the direction of movement of the wheeled car, whereby the drill pot may be moved in a transverse direction to position the drill axis in successive positions in said transverse plane and the boom moved to move the drill pot to carry the drill axis vertically in the said plane, the pivotal connection between the bed and the car being reciprocable longitudinally of the car, and the means for moving the bed about its pivotal connection comprising a swinging lever pivoted at one end to the car and at the other end to the bed, the swinging lever arranged to project from its pivotal connection to the car in a direction opposite to the projection of the bed from its pivotal connection to the car, and means to move the swinging lever.

13. A portable drilling machine comprising a wheeled car, a bed mounted on the car, a boom pivotally mounted at one end on the bed for swinging movement in a vertical plane, a drill pot having a drill axis pivotally mounted on the other end of the boom, means to swing the boom vertically while confining the movement of the drill axis along a predetermined straight vertical line, said bed being pivotally mounted at one end on the car for swinging movement in a horizontal plane transversely of the car, and means to swing the bed transversely while confining the movement of the drill axis to a vertical plane at right angles to the direction of movement of the wheeled car, whereby the drill pot may be moved in a transverse direction to position the drill axis in successive positions in said transverse plane and the boom moved to move the drill pot to carry the drill axis vertically in the said plane, the pivotal connection between the boom and the bed being reciprocable longitudinally of the bed, and the means for moving the boom about its pivotal connection comprising an elevating link pivotally connected at one end to the bed and at the other end to the boom intermediate the ends of the boom, the elevating link arranged to project from its pivotal connection to the bed in a direction opposite to the projection of the boom from its pivotal connection with the bed, and means to move the elevating link, and the pivotal connection between the bed and the car being reciprocable longitudinally of the car, and the means for moving the bed about its pivotal connection comprising, a swinging lever pivoted at one end to the car and at the other end to the bed, the swinging lever arranged to project from its pivotal connection to the car in a direction opposite to the projection of the bed from its pivotal connection to the car, and means to move the swinging lever.

References Cited by the Examiner
UNITED STATES PATENTS

| | | | |
|---|---|---|---|
| 1,667,115 | 4/1928 | Hyde | 280—104 |
| 2,534,569 | 12/1950 | Bowditch | 74—103 |
| 2,569,354 | 9/1951 | Tracy | 74—103 |
| 2,698,735 | 1/1955 | Lehner | 173—38 |
| 2,716,019 | 8/1955 | Shacikoski | 175—211 |
| 2,815,191 | 12/1957 | Beltz | 173—38 |
| 2,879,035 | 3/1959 | Tilden | 175—209 |
| 2,914,338 | 11/1959 | Kress | 280—104 |

OTHER REFERENCES

Jones, F. D.: (editor), Ingenious Mechanisms for Designors and Inventors, N.Y., The Industrial Press, 1926 TJ 175. J62 (p. 392 relied on).

BROUGHTON G. DURHAM, *Primary Examiner.*

D. FAULCONER, LAWRENCE P. KESSLER,
*Assistant Examiners.*